United States Patent [19]

Bishop

[11] Patent Number: 4,827,838
[45] Date of Patent: May 9, 1989

[54] DECORATIVE FISH MOLD AND METHOD OF USING SAME

[76] Inventor: Margaret E. Bishop, 2396 Booker Ave., Twin Oaks, Chester, Pa. 19014

[21] Appl. No.: 184,658

[22] Filed: Apr. 22, 1988

[51] Int. Cl.$^4$ .............................................. A22C 7/00
[52] U.S. Cl. ...................................... 99/426; 99/430; 99/349; 426/420; 426/513; 249/154; D7/5
[58] Field of Search ................ 99/426, 430, 441, 439, 99/349, 350, 351, 421 H, 421 R; 426/420, 468, 469, 479, 512, 513; 249/154; D7/5

[56] References Cited

U.S. PATENT DOCUMENTS

| | | | |
|---|---|---|---|
| 38,981 | 1/1908 | Thiesen | D7/5 |
| D. 99,558 | 5/1936 | Straus | D7/5 |
| D. 209,157 | 11/1967 | Levin | D44/1 |
| D. 227,428 | 6/1973 | DiLorenzo | D7/85 |
| D. 253,025 | 10/1979 | Lewis | D7/44 |
| D. 270,598 | 9/1983 | Miller | D7/43 |
| 1,013,244 | 1/1912 | Watson | 426/420 |
| 1,911,100 | 5/1933 | Winemiller | D7/5 |
| 2,402,121 | 6/1946 | Brewster et al. | 426/513 |
| 2,850,962 | 9/1958 | Beavers | 99/426 |
| 3,821,423 | 6/1974 | Jamin | 426/106 |
| 4,217,817 | 8/1980 | Meamber | 99/349 |

FOREIGN PATENT DOCUMENTS 847969  7/1981  U.S.S.R. ............................. 426/513

OTHER PUBLICATIONS

Tableware International, Feb. 1981, p. 67.

Primary Examiner—Harvey C. Hornsby
Assistant Examiner—Christine A. Peterson
Attorney, Agent, or Firm—Caesar, Rivise, Bernstein, Cohen & Pokotilow, Ltd.

[57] ABSTRACT

A decorative fish head mold for use as a replacement for a fish's head when serving and/or cooking a fish includes a hollow elongate body defining an interior compartment. The body has a forward or distal end configured to the appearance of a fish head, and an open rear end communicating with the interior compartment for receiving a body of a fish therein. In accordance with the method of this invention, the head of a fish is removed, and if desired, the body of the fish is filled with a stuffing. Thereafter the body of the fish, either stuffed or unstuffed, is inserted into the open rear end of the decorative fish head mold, and is thereafter cooked and/or served as a unit with the fish head mold.

7 Claims, 2 Drawing Sheets

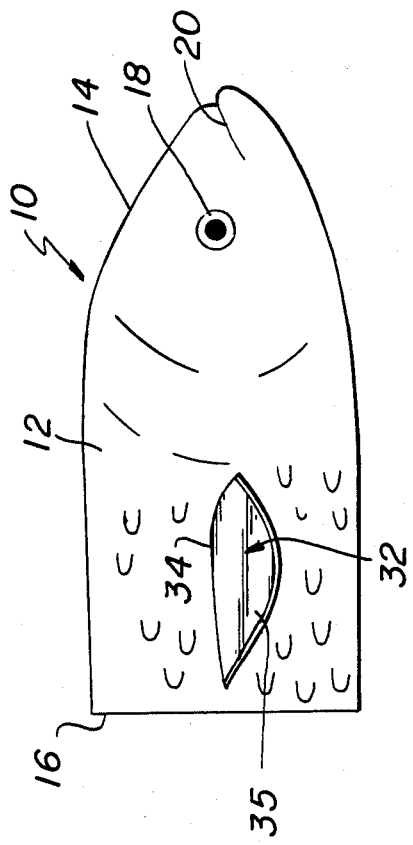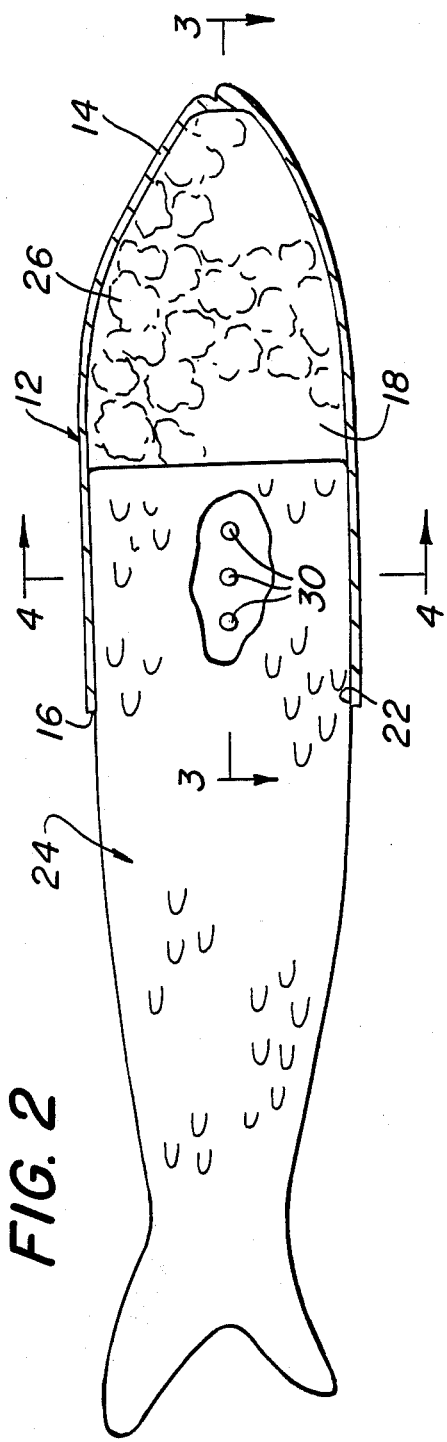

4,827,838

DECORATIVE FISH MOLD AND METHOD OF USING SAME

FIELD OF THE INVENTION

This invention relates generally to a decorative fish head mold and more specifically to a decorative fish head mold for use as a replacement for a fish's head when serving and/or cooking the fish.

BACKGROUND ART

When cooking and serving fish; particularly baked stuffed fish, it is common to filet the fish, and then insert the stuffing in the fish's interior without removing the head. Many people find it offensive when the whole fish is served in this manner. The alternative has been to actually remove the fish's head prior to serving. However, there are some people that regard the serving of a fish with its head removed as lacking elegance and style.

U.S. Pat. No. 3,821,423, issued to Jamin, discloses a chocolate article on which a removable, figured body member is placed. In the illustrated embodiments the chocolate body is of a simple geometric shape, such as the cone-shape illustrated in FIG. 1, and the figured body attached to the chocolate article can vary, depending upon the holiday season for which the article of chocolate is being sold.

The Jamin U.S. Pat. No. 3,821,423 does not disclose a decorative fish head mold that is intended to replace a fish's head when the fish is being served and/or cooked.

The design patents to Levin (U.S. Des. Pat. No. 209,157), DiLorenzo (U.S. Des. Pat. No. 227,428), Lewis (U.S. Des. Pat. No. 253,025) and Miller (U.S. Des. Pat. No. 270,598) all disclose food molds having different configurations. The Levin U.S. Des. Pat. No. 209,157 discloses an open, pan-shaped mold having an inner food-receiving compartment thereof configured to simulate the appearance of a fish. This latter mold is not designed and constructed to be secured to the body of a fish for either serving or cooking purposes.

SUMMARY OF THE INVENTION

In accordance with this invention a decorative fish head mold for use as a replacement for a fish's head when a fish is served and/or cooked includes a hollow elongate body defining an interior compartment, said body having a distal or forward end configured to the appearance of a fish head, and an open rear end communicating with the interior compartment for receiving a body of a fish therein.

In a preferred embodiment the hollow elongate member is made of a metal, such as aluminum, which is safe for use in cooking the fish. Thus, the body of the fish can be assembled directly with the decorative fish head mold and cooked as a single unit. If desired, a stuffing can be inserted into the fish and mold prior to cooking, thereby providing a convenient system for preparing baked stuffed fish.

An additional advantage of this invention is that the cooked fish can actually be served with the decorative fish head mold attached thereto, thereby providing for an elegant presentation.

In the most preferred embodiment of this invention fastener means are provided for attaching the fish head mold to the body of the fish. Each fastener means preferably has a body section configured to the appearance of a fin, and pin means projecting from the body section for insertion into mating holes extending through the periphery wall of the mold, for piercing the body of the fish inserted into the interior compartment of the mold.

Most preferably a pair of fasteners with body sections configured to the appearance of a fin are inserted through sets of openings which are circumferentially spaced-apart about the body of the hollow elongate member of the fish head mold, to thereby simulate the fins of the fish while, at the same time, securing the body of the fish to the mold.

BRIEF DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 1 is a side elevational view of a decorative fish head mold in accordance with this invention;

FIG. 2 is a longitudinal sectional view showing the body of a fish assembled with the fish head mold;

DESCRIPTION OF THE PREFERRED EMBODIMENT OF THE INVENTION

Figure 3:
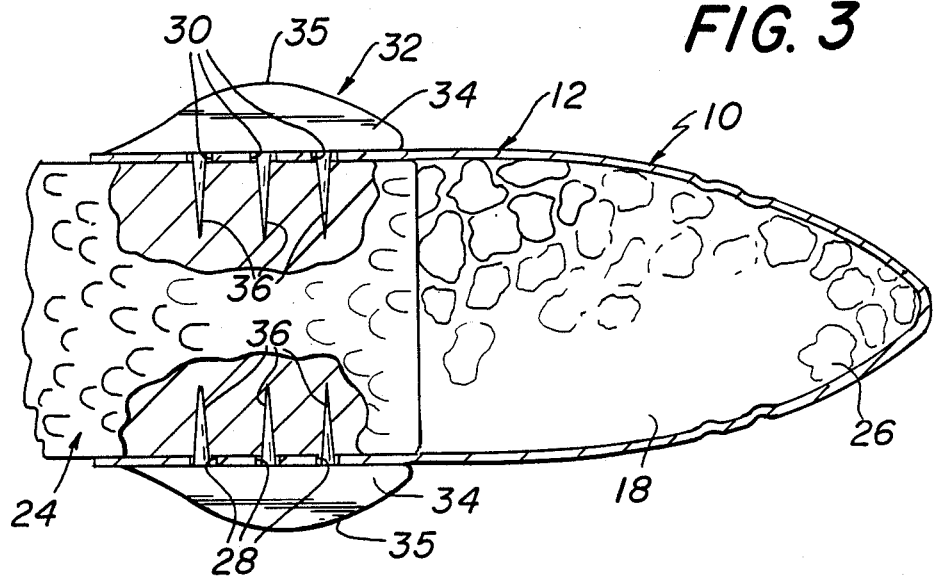
FIG. 3 is a sectional view taken along line 3—3 of FIG. 2.

Referring now in greater detail to the various figures of the drawings wherein like reference characters refer to like parts, a decorative fish head mold embodying the present invention is shown generally at 10 in FIG. 1. This mold 10 includes a hollow elongate body 12 having a forward or distal end 14 configured to the shape and appearance of a fish head, and a rear end 16 providing an opening 22 to receive the body of the fish therein.

Referring specifically to FIGS. 1 and 2, the hollow elongate body 12 defines an interior compartment 18 therein which communicates with the opening 22. Moreover, the forward or distal end 14 of the mold, which is configured to the shape of a fish head, preferably includes eyes 18 (only one of which is shown) and a mouth 20 simulating a pleasing appearane of a fish's head.

As can be seen best in FIGS. 2 and 3, and as stated above, the rear end 16 of the mold provides an opening 22 which communicates with the interior compartment 18 for receiving the body 24 of a fish therein. If desired, the fish and mold can be filled with a suitable stuffing 26, which can then be placed in an oven as a single unit for preparing baked, stuffed fish. In connection with this most preferred embodiment, the hollow elongate body 12 is made from aluminum or other suitable heat-conductive material which has been proven safe for cooking purposes.

Referring specifically to FIGS. 2 and 3, two sets of openings 28 and 30 are provided through the peripheral wall of the elongate body 12, intermediate the distal end 14 and rear end 16 thereof. Most preferably these sets of openings are provided in regions approximating the location of the fish's fins.

Figure 4:
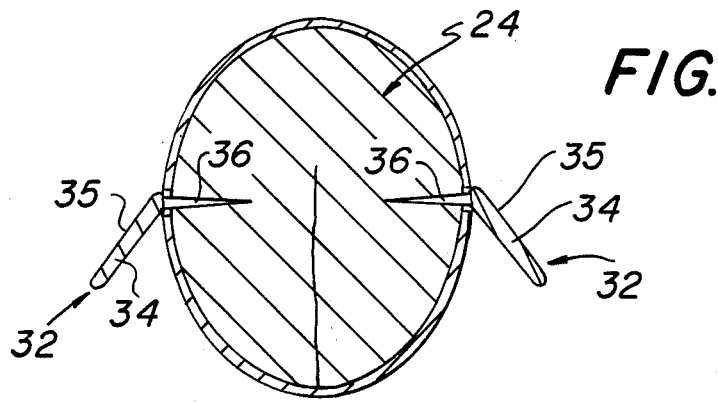
FIG. 4 is a vertical sectional view taken along line 4—4 of FIG. 2.

Referring to FIGS. 1, 3 and 4, the fish head mold 10 preferably includes a pair of fasteners 32, in the form of skewers. Each of these skewers includes a body section 34 having an outer fin-shaped surface 35, and a plurality of pins 36 extending generally perpendicular to the body section from an inner surface 38 thereof. The pattern of pins 36 associated with each of the fasteners 32 matches the pattern of openings in each of the sets 28 and 30, to thereby permit the pins of the fasteners to be inserted through the openings into communication with the interior compartment 18 of the mold. When the body of a fish 24 is inserted into the interior compartment, the pins 36 of the fasteners pierce the fish's body to thereby firmly attach the mold 10 to the fish's body.

In the illustrated embodiment, each of the sets of openings 28 and 30 includes three, linear aligned openings. However, the number and arrangement of openings in each set is a matter of design choice, and does not constitute a limitation on the present invention. In fact, if desired, each of the sets 28 and 30 actually can be replaced by a single opening, to thereby receive a fastener 32 having only a single pin.

In accordance with the method of this invention the fish's head is first removed, and the body of the fish is inserted into the interior compartment 18 of the elongate body 12, through the opening 22 in the rear end 16 of said mold. Thereafter, the pins 36 of the fasteners 32 are inserted through the sets of openings 28 and 30 to thereby attach the body of the fish 24 to the mold 10. The entire assembly is then inserted into an oven to bake the fish, and the baked fish can thereafter be served with the decorative mold still retained thereon to provide an elegant presentation.

In accordance with a preferred use of the mold, the body of the fish, and if desired, a portion of the mold, can be filled with a stuffing prior to attaching the mold to the fish body and thereafter baking the fish.

Without further elaboration, the foregoing will so fully illustrate my invention that others may, by applying current or future knowledge, adopt the same for use under various conditions of service.

What is claimed as the invention is:

1. A decorative fish head mold for use as a replacement for a fish's head when serving and/or cooking fish, said mold including a hollow elongate body defining an interior compartment, said body having a distal end configured to the appearance of a fish head and a rear end providing an opening communicating with the interior compartment for receiving a body of a fish therein, fastening means including pin means for passing through the hollow elongate body into the interior compartment, said pin means adapted for receipt into a fish body inserted into the interior compartment of the hollow elongate body, to thereby attach the fish head mold to the body of the fish.

2. The decorative fish head mold of claim 1, wherein the hollow elongate body is made of a metal which is safe for use in cooking food.

3. The decorative fish head mold of claim 1, wherein said fastening means has a body section configured to the appearance of a fin, said pin means extending from said body section.

4. The decorative fish head mold of claim 3, including openings extending through the elongate body in a region intermediate the distal end and rear end thereof, said pin means of said fastening means being arranged for receipt in said openings.

5. The decorative fish head mold of claim 4, including two sets of openings extending through the hollow elongate body in a region intermediate the distal end and rear end of said elongate body, said sets being circumferentially spaced from each other about the periphery of the elongate body in regions approximating the locations of the fins of a fish, said fastening means including a pair of fasteners, each fastener including a body section having an outer surface configured to the appearance of a fin and a plurality of pins extending outwardly from a surface of said body portion, the pins of each fastening means being arranged for receipt in a respective set of openings to thereby simulate the appearance of the fins of a fish while at the same time projecting into the interior compartment of the hollow elongate body to secure a fish body to the fish head mold.

6. A method of preparing a fish for cooking and/or serving including the steps of:
providing a mold having a hollow elongate body defining an interior compartment, said body having a distal end configured to the appearance of a fish head and an open rear end communicating with the interior compartment for receiving a body of a fish therein;
severing the head of a fish from the body of the fish;
inserting the fish, with the head thereof removed, into the interior compartment of the hollow elongate body of the mold through the open rear end of said hollow elongate body;
inserting a fastening means through the hollow elongate body after the body of the fish has been inserted into the interior compartment, for piercing the body of the fish to secure the fish to the mold; and
cooking and/or serving the fish with the fish being within the interior compartment of the hollow elongate body of the mold.

7. The method of claim 6 wherein the step of inserting the fastening means into the interior compartment is accomplished by inserting a plurality of pins of the fastening means into a plurality of aligned openings extending through the peripheral wall of the hollow elongate body of the mold.

* * * * *